United States Patent [19]

DeSantis

[11] 4,239,169
[45] Dec. 16, 1980

[54] DISPLAY STAND

[76] Inventor: John DeSantis, 115 Overlook Ave., Staten Island, N.Y. 10304

[21] Appl. No.: 67,739

[22] Filed: Aug. 20, 1979

[51] Int. Cl.³ .................... F16M 11/00; F16B 7/10
[52] U.S. Cl. .................................. 248/412; 108/146; 248/125; 248/188.5; 403/109; 403/368
[58] Field of Search ........... 248/412, 410, 125, 188.5; 297/349; 403/109, 367, 368, 112; 108/150, 146

[56] References Cited

U.S. PATENT DOCUMENTS

| 461,238 | 10/1891 | Cox et al. ............................. 248/412 |
| 2,850,308 | 9/1958 | LeFebure et al. ................. 403/367 X |
| 3,035,858 | 5/1962 | Davidson et al. ............. 248/188.5 X |
| 3,220,743 | 11/1965 | Knapp ............................. 403/368 X |
| 3,715,997 | 2/1973 | Barth ............................. 248/412 X |
| 3,737,136 | 6/1973 | Snurr ............................. 403/109 X |

FOREIGN PATENT DOCUMENTS

| 262,549 | 6/1968 | Austria ................................. 248/412 |
| 549,764 | 5/1932 | Fed. Rep. of Germany ........ 248/188.5 |
| 592,324 | 4/1925 | France ................................. 248/412 |
| 236,965 | 3/1945 | Switzerland .................. 248/188.5 |

Primary Examiner—James T. McCall
Attorney, Agent, or Firm—Pasquale A. Razzano

[57] ABSTRACT

A display stand for merchandise such as clothing or the like includes a base supporting a telescopic stand structure formed from a pair of telescopic tubular members. The upper tubular member has an inner end portion including an angled cam surface thereon which receives a cam member between the cam surface and an adjacent inner wall of the lower or outer tubular member. A threaded rod is secured to the cam and extends through the upper tubular member to an upper threaded free end on which a nut is threadably received. Rotation of the nut causes the cam to wedge between the inclined surface of the inner tubular member and the inner adjacent surface of the outer tubular member, to lock the telescopic members in position.

8 Claims, 4 Drawing Figures

U.S. Patent   Dec. 16, 1980   Sheet 1 of 2   4,239,169
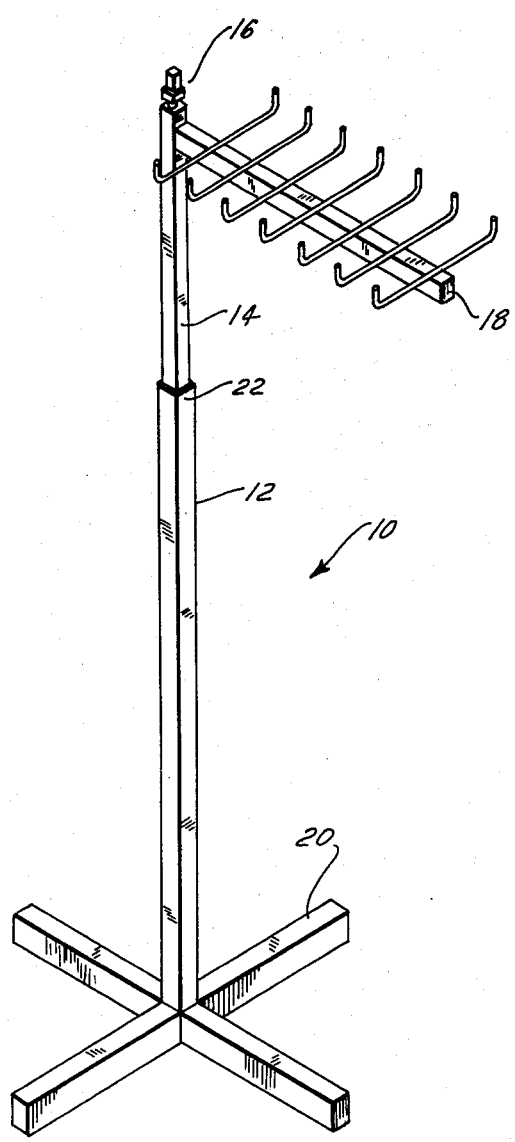
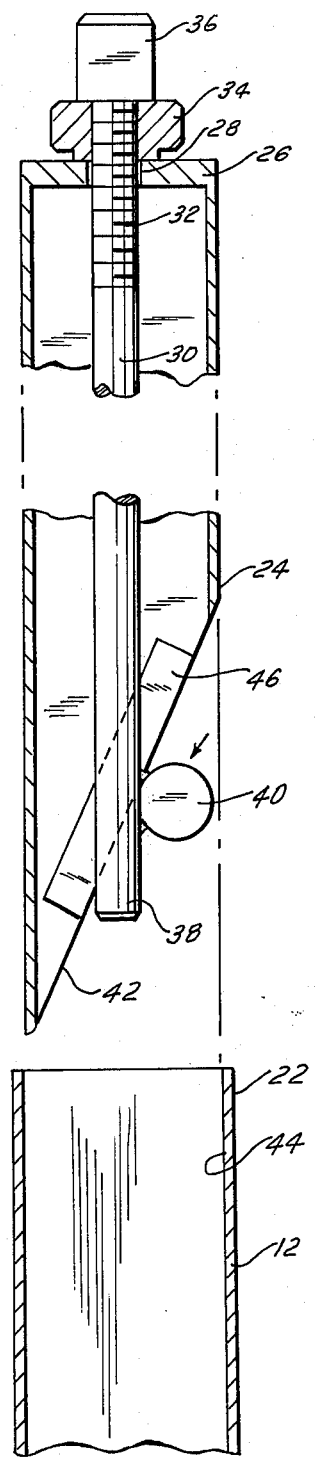

DISPLAY STAND

The present invention relates to a display stand, and more particularly, to a display stand for clothing and the like which is telescopically adjustable.

Display stands used in department stores for exhibiting clothing and other merchandise have been provided in many different configurations. Typically these stands are provided in a single size or height, although there have been proposals for producing display stands which include telescopic members, so that the height of the stand can be adjusted to accommodate different types of merchandise. Such display stands are shown, for example, in U.S. Pat. Nos. 2,224,527, 2,604,214 and 3,807,574. Each of these prior art devices utilize relatively complicated clamping mechanisms to secure the telescopic members in a fixed relative position.

It is an object of the present invention to provide a telescopic display stand which is relatively simple in construction and which uses a minimum of parts to lock the telescopic members together.

A still further object of the present invention is to provide a telescopic display stand which is relatively easy and reliable in adjusting.

Another object of the present invention is to provide a telescopic display stand in which the telescopic adjustment can be simply and rapidly effected.

A still further object of the present invention is to provide a telescopic display stand which is relatively inexpensive to manufacture.

In accordance with an aspect of the present invention, the display stand includes a first elongated hollow support tube having a generally rectangular cross-section secured to a base and having an upper open end. A second elongated hollow support tube having a slightly smaller rectangular cross-section than the first tube is received in the open upper end of the first tube. The second tube has a first open end received in the first tube and a second closed end having an opening formed therein. The first end of the second tube includes an inclined cam surface extending at an angle to the longitudinal axis of the tubes and towards one of the inner side walls of the first tube. An elongated rod extends through the second tube and the opening therein and includes a first end located adjacent to the first end of the second tube and a second threaded upper end located above the second end of the second tube. A nut is threadedly engaged with the threaded upper end of the rod and a cam is secured to the first end of the rod in engagement with the cam surface of the second tube. By this construction rotation of the nut in a first direction wedges the cam between the cam surface and the one inner side wall of the first tube to lock the tubes together. Rotation of the nut in an opposite direction releases this engagement and permits the tubes to telescope with respect to each other.

The above, and other objects, features and advantages of this invention will be apparent in the following detailed description of an illustrative embodiment thereof, which is to be read in connection with the accompanying drawings, wherein:

FIG. 1 is a perspective view of a display stand constructed in accordance with the present invention;

FIG. 2 is an exploded longitudinal side sectional view of the locking mechanism used in the display stand of FIG. 1;

Figure 3:
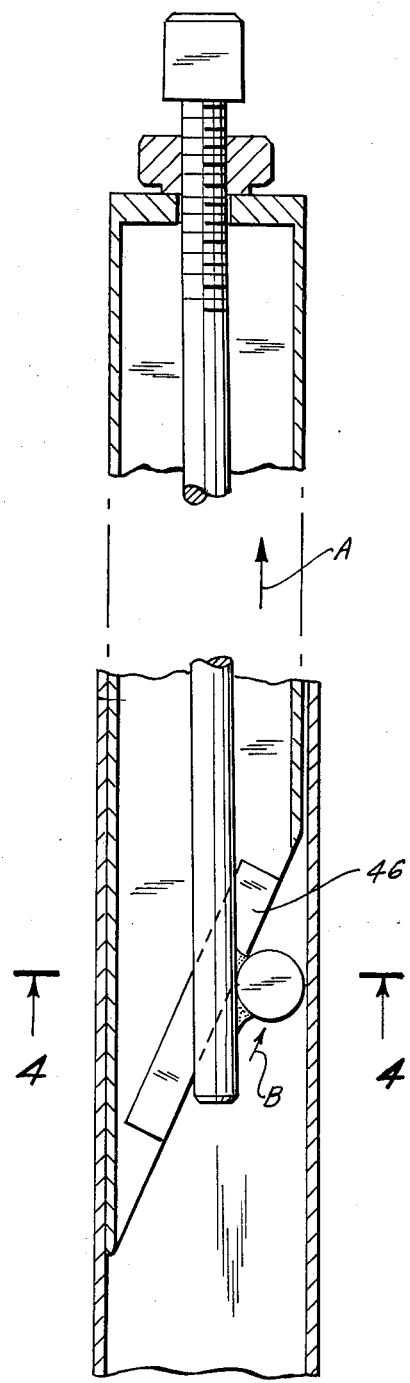
FIG. 3 is a side sectional view, similar to FIG. 2, showing the tubes of the display stand locked together.

Referring now to the drawing in detail and initially to FIG. 1 thereof, the article display stand 10 includes first and second telescopic tubular members 12, 14 respectively. A locking mechanism 16 is supported in tube 14 and permits the relative vertical positions of the tubes to be adjusted as desired by a simple manipulation.

A support arm 18 is rigidly secured to the tube 14 to support hangers for dresses and the like. And, the lower end of tube 12 includes a base 20, in the conventional manner.

Figure 4:
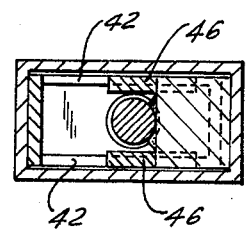
FIG. 4 is a sectional view taken along line 4—4 of FIG. 3.

Tube 12 is hollow and has a generally rectangular cross-section (see FIG. 4) including an upper open end 22. Tube 14 is also hollow and has a generally rectangular cross-sectional configuration. This tube includes an open first or lower end 24 and a closed second or upper end 26. However, end 26 includes an opening 28 formed therein. Both tubes 12 and 14 are preferably formed of a rigid metal material such as aluminum or steel. And, tube 14 is dimensioned such that it can be received through open end 22 of tube 12.

Locking mechanism 16 includes a rod 30 which extends through tube 14 and has an upper threaded end 32 which passes through and above opening 28 in end wall 26 of tube 14. The rod is threadedly engaged with a nut 34 located above the end 26 of tube 14, and the nut is retained on the rod against removal by a second, cap nut 36 secured to the free end of the rod.

The lower or opposite end 38 of rod 30 has a cam member 40 secured thereto. This cam member, in the preferred embodiment of the present invention, is a cylindrical rod, formed of steel or the like, welded to the end of rod 30, transversely to the longitudinal axis of the rod.

The lower free end 24 of tube 14 has its opposed long side edges 42 cut at an inclined angle, tapering towards one of the inner side walls 44 of tube 12. In addition, cam blocks 46 are welded to the interior side walls of tube 14 along, and in alignment with, the edges 42 of its lower end. Cam member 40 is located to engage these cam blocks and edges 42 of the lower end of tube 14.

By this construction, tube 14 can be inserted in open end 22 of tube 12, as illustrated in FIG. 2, so that cam 40 is captured in the wedge-shaped space defined by the edges 42 and cam blocks 46 on the inner end 24 of tube 12 and the side wall 44 of tube 12. By tightening nut 34 (which rests on the outer end 26 of tube 14) on rod 30, the rod will be drawn upwardly in the direction of arrow A in FIG. 4, thereby urging cam 40 along edges 42 in the direction of arrow B, causing the cam block to wedge between those edges and side wall 44. This tight wedging engagement serves to frictionally lock tube 14 in a fixed position with respect to tube 12. It is noted that opening 28 in tube 14 is large enough to permit the slight canting of rod 30 that is necessary to accommodate the lateral movement of cam 40. Rotation of nut 34 in the unlocking direction will drive rod 30 in the opposite direction, i.e., downwardly in FIG. 3, moving cam 40 in the direction of the arrows C of FIG. 2, releasing the wedging engagement thereof between the angled cam edges 42 and surface 44 so that the tube 14 can be telescoped with respect to tube 12.

Accordingly, it is seen that a relatively simply constructed cam locking arrangement is provided in a telescopic display stand, which is relatively inexpensive to produce, and which will be durable in use. The height of the stand is easily adjusted by a manual manipulation of the nut 34 permitting the operator to rapidly change the height of the stand.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A display stand comprising first and second telescopically engaged elongated stand elements, said first element having an inner end received within said second element and a remote outer end; said first end having an inclined face located at an angle to the longitudinal axis of said first element; an elongated rod extending through said first element from a first end adjacent the first end of said first stand element to a second end extending beyond the second end of the first stand element; a cam member secured to the first end of the rod in position to engage the inclined face of said first stand element; said second end of the rod being threaded, and a nut threadedly engaged with said rod and bearing against the second end of said first stand element whereby rotation of the nut in a first direction moves said cam against said inclined face and wedges it between said inside face and the inner surface of said second stand element to lock said elements together; and rotation of said nut in an opposite direction moves the cam away from said inclined face and the inner surface of said second stand element to permit said stand elements to telescope with respect to one another.

2. A display stand as defined in claim 1 including cam blocks secured to said first end of the first stand element adjacent said inclined face thereof for engaging said cam.

3. A display stand as defined in claims 1 or 2 wherein said cam is a generally cylindrical member secured to said rod to extend transversely of the rod.

4. A display stand as defined in claim 3 wherein said second stand element includes a support base and said first stand element includes a support arm secured thereto adjacent said second end.

5. A display stand comprising a first elongated hollow support tube having a generally rectangular cross-section, a first end including a support base and an open second upper end; a second elongated hollow support tube having a slightly smaller rectangular cross-section than said first tube to be received in the open upper end of said first tube; said second tube having a first open end received in said first tube and a second closed end having an opening formed therein; said first end of said second tube including an inclined cam surface extending at an angle to the longitudinal axis of the tubes and towards one of the inner side walls of said first tube; an elongated rod extending through said second tube and the opening therein and including a first end located adjacent the first end of the second tube and a second threaded upper end located above the second end of said second tube; a nut threadedly engaged with said threaded upper end of the rod; and a cam secured to said first end of the rod in engagement with said cam surface whereby rotation of said nut in a first direction wedges the cam between said cam surface and said one inner side wall to lock said tubes together; and rotation of said nut in an opposite direction releases such engagement to permit said tubes to telescope with respect to each other.

6. A display stand as defined in claim 5 including cam blocks secured to said first end of said second tube defining said inclined cam surface.

7. A display stand as defined in claim 6 wherein said first end of said second tube has parallel free edges inclined at the same angle as said cam blocks.

8. A display stand as defined in claim 7 wherein said cam is a generally cylindrical member secured to said rod to extend transversely of the rod.

* * * * *